United States Patent [19]

Martinez

[11] Patent Number: 5,656,126

[45] Date of Patent: Aug. 12, 1997

[54] HEAT WELDING ACCESSORIES

[76] Inventor: Leo Martinez, 21722 Pioneer Blvd., Hawaiian Gardens, Calif. 90716

[21] Appl. No.: 595,776

[22] Filed: Feb. 5, 1996

[51] Int. Cl.$^6$ ............................................. B32B 31/00
[52] U.S. Cl. ..................... 156/574; 156/304.1; 156/579; 222/146.5; 401/2; 401/48
[58] Field of Search ..................... 156/304.1, 574, 156/578, 579; 401/1, 2, 48; 222/146.5, 146.1

[56] References Cited

U.S. PATENT DOCUMENTS

| | | | |
|---|---|---|---|
| 1,312,347 | 8/1919 | Ogden | 401/2 |
| 2,118,415 | 5/1938 | Pesark | 401/1 |
| 2,220,545 | 11/1940 | Reinhardt | 156/309.6 X |
| 3,472,725 | 10/1969 | Evans | 156/579 X |
| 3,853,669 | 12/1974 | Werstlein | 156/574 X |

FOREIGN PATENT DOCUMENTS

| | | | |
|---|---|---|---|
| 818066 | 8/1959 | United Kingdom | 156/574 |

*Primary Examiner*—Jeff H. Aftergut
*Attorney, Agent, or Firm*—Charles H. Thomas

[57] ABSTRACT

An apparatus is provided for sealing seams between adjacent sheets of flooring which define an upwardly facing, elongated groove where they meet. A conventional hand-held portable seam welding gun has a body defining a longitudinal axis. A heat concentration nose is mounted on a heat conducting member. A heating tip mounting post projects at an angle of at least about fifteen degrees, from the longitudinal axis of the seam welding gun. A hollow heating tip employed on the mounting post is provided with a forwardly directed, upturned toe having a concave, downwardly facing groove therein forward of the front extremity of a sealant dispensing mouth. Also, a heating duct extends between the melting chamber of the heating tip and an orifice located behind the rear extremity of the sealant dispensing mouth. The welding gun employs a mobile, stabilizing guide formed with a pair of laterally spaced outboard rollers and a seam follower located midway between the rollers and a track follower that rides in the groove between adjacent flooring sheets. An adapter secures the guide to the welding gun body. A releasable fastener between the guide and the adapter holds the welding gun at a desired angle to the floor.

20 Claims, 6 Drawing Sheets

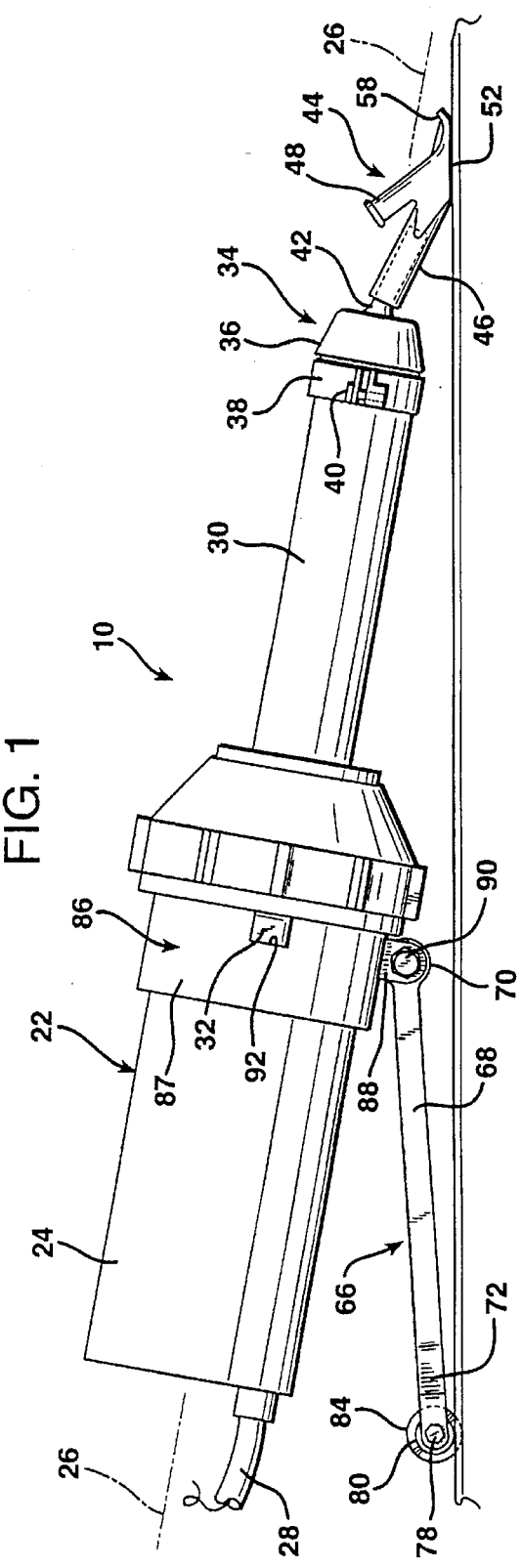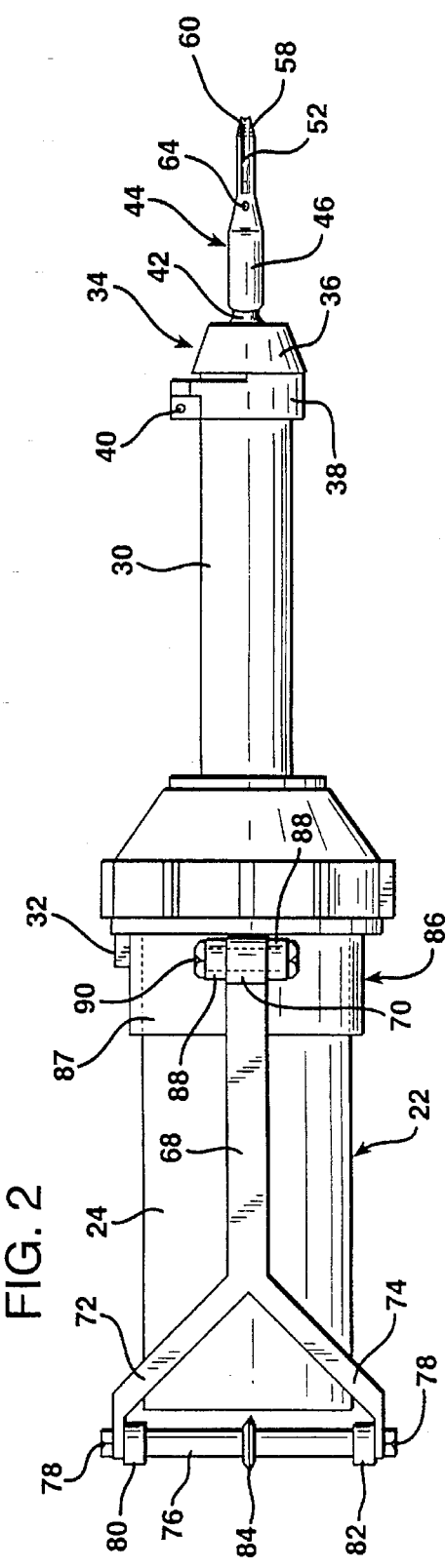

HEAT WELDING ACCESSORIES

BACKGROUND OF THE INVENTION

1. Field of the Invention

The present invention relates to accessories for use with a portable seam welding gun that is used to seal seams between adjacent sheets of flooring, and the combination of these accessories with such a portable seam welding gun.

2. Description of the Prior Art

In laying flooring that is sold commercially in sheets, such as linoleum flooring, adjacent sheets of flooring are positioned side by side and cut to the desired shape. In the past the flooring sheets have been secured to the floor by adhesive compound. To secure the flooring sheets the compound is applied to the floor and the cut sheets of flooring are laid in position, one by one. Once each sheet of flooring is laid, the next adjacent flooring sheet is brought into position and pressed against the floor with the linear edges of adjacent flooring sheets residing in mutual abutment.

One major problem with laying sheets of flooring in this manner is that the adhesive bond between the underside of the flooring sheets and the subfloor therebeneath is sometimes inadequate. Quite often areas of the sheets of the flooring will tend to separate from the subfloor when the adhesive bond between the subfloor and the flooring sheets deteriorates due to age, movement of the subfloor, or improper installation.

The separation of areas of flooring sheets from the subfloor is particularly pronounced at the interfaces between adjacent sheets of flooring. The edges of adjacent flooring sheets which are supposed to reside in firm, mutual abutment, will sometimes tend to rise slightly from the subfloor. This presents both an unsightly appearance and also leads to a significant deterioration of the floor because of the separation that occurs when the edges of adjacent sheets of flooring rise. When separation between adjacent sheets of flooring occurs in this way, moisture, dirt and debris often find their way into the crack that forms between the flooring sheets, thus leading to further deterioration of the floor.

In the floor installation trade the use of fusible plastics to form a seal between the abutting edges of adjacent sheets of flooring has gained increased popular acceptance. According to this technique the edges of sheets of flooring are not cut perpendicular to the plane of the expanse of the flooring as has historically been the practice. Rather, the edges of the flooring are cut so that adjacent sheets of flooring, when moved into abutting relationship, define an upwardly facing, elongated groove where they meet. That is, the sheets of flooring are cut so that the exposed upper surface covers a slightly smaller area than the concealed undersurface, thus providing adjacent surfaces forming a groove or channel between adjoining sheets of flooring. These adjacent surfaces can be bonded together using a fusible thermoplastic applied from above. The color of the thermoplastic is chosen to match the color of the flooring so as to render the demarcation between adjacent sheets of flooring largely undetectable.

Large, relatively bulky, automated machines have been developed for applying a fusible plastic sealant to seams between adjacent sheets of flooring. Such automated machines roll upon the floor and apply a bead of molten thermoplastic along the seam between adjacent sheets of flooring. The heat required is provided by electrical resistance heating. The molten thermoplastic quickly cools and bonds to the adjoining edges of adjacent sheets of flooring. Once the adjoining edges of sheets of flooring have been sealed in this manner, they will not separate from each other, even in the event that the bond between the undersides of the sheets of flooring and the subfloor deteriorates with time. This prevents a noticeable gap from forming between adjacent sheets of flooring.

While automated seam sealing machines of the type described perform quite adequately for creating firm, durable sealed seams between adjacent sections of sheet flooring, their cost is well beyond the resources of the average sheet flooring installer. Therefore, a much more economical type of machine for creating a seam of fused thermoplastic between adjacent sheets of flooring was developed. Specifically, portable, hand-held seam welding guns have been available commercially for quite some time. Such hand-held guns are sold at only a fraction of the cost of automated seam welding machines and are also typically electrically powered and melt a thermoplastic bead by means of resistance heating.

Hand-held seam welding guns of this type are typically configured with a generally cylindrical body forming the rear portion of the gun and a heat conducting member projecting forwardly from the body along a longitudinal axis. A heat concentration nose, typically formed of a highly conductive metal, such as copper or a copper alloy, is mounted on the heat conducting member and includes a heating tip mounting post. The heating tip mounting post projects forwardly along the longitudinal axis of the body and may be of a narrow, tubular configuration. The heating tip mounting post accommodates a hollow heating tip.

A conventional, portable, hand-held seam welding gun heating tip includes a hollow cylindrical sleeve that fits onto the heating tip mounting post and another tubular structure that accommodates an elongated length of thermoplastic that is fed into the tip and melted therein. Conventional, hand-held seam welding guns of this type are manufactured in Europe and sold under the brand names Leister and Zinser. Both of these types of hand-held seam welding guns are sold commercially by Janser, Inc., located at 200 Paw Paw Avenue, Benton Harbor, Mich. 49022-3400.

While conventional, hand-held, portable seam welding guns of the type described can produce high quality seams, it is extremely difficult to manually manipulate these devices to consistently achieve a high quality seam. Because the hand-held, portable seam welding guns are relatively small in size, they must be held by the installer at just the right orientation relative to the floor in order for the thermoplastic welding rods to melt and flow properly into the elongated groves formed between adjacent sheets of flooring and to properly bond to the adjacent edges of the mutually abutting sheets of flooring to establish a secure, permanently sealed seam. If the hand-held seam sealing guns are held at too great or too small an angle relative to the floor, the thermoplastic welding rods will not flow properly into the channel defined between the adjacent sheets of flooring as they melt, or will not bond properly to both of the adjacent edges of adjoining flooring sheets.

Likewise, if portable, hand-held seam sealing guns of this type are tilted even slightly to one side or the other, bonding to the adjoining edges of the flooring sheets is likely to be inconsistent. Thus, the proper operation of such hand-held seam sealing guns requires intense concentration and allows virtually no margin of error. The seams produced by these devices are therefore quite likely to be defective.

Furthermore, the physical configuration of the parts of conventional, hand-held seam sealing guns is such that the flooring installer in unable to visually see whether or not the molten plastic substance is being extruded at the proper angle relative to the floor. The necessary visual observation in this regard can only be performed if the installer kneels far forward and positions his head quite close to the floor while operating the device. This is an extremely tedious and tiring process. Furthermore, with the great fatigue which the installer typically experiences from remaining in this position, mistakes in orientation of the welding gun, and hence defective seams between sheets of flooring, become more and more likely.

SUMMARY OF THE INVENTION

It is an object of the present invention to provide heat welding accessories for use with a portable, hand-held seam welding gun that allow operation of the seam welding gun so as to achieve a much higher quality and consistent seam between adjacent flooring sheets than has heretofore been possible using these hand-held devices. By utilizing the heat welding accessories of the invention a flooring installer is able to operate an otherwise conventional, hand-held, portable welding gun much more easily and in a manner that results in the production of seams between adjoining sheets of flooring that are far more consistent and sound than has heretofore been possible.

A further object of the invention is to provide accessories which hold a portable, hand-held seam sealing gun in proper orientation relative to the floor without the necessity for constant, close visual monitoring from an extremely uncomfortable position on the part of the installer. That is, once the seam welding accessories of the invention have been adjusted to the proper positions for the job, the accessories maintain the hand-held seam welding gun in the desired orientation.

A further object of the invention is to provide heat welding accessories for producing consistently high-quality, thermally fused seams between adjacent sheets of flooring with far less fatigue to the installer than has heretofore been possible utilizing a hand-held seam welding gun.

Still a further object of the invention is to provide a flooring installer with accessories so that a relatively inexpensive hand-held implement can be used to create a consistently high-quality, thermally welded seam between adjacent flooring sheets. Installers of modest means are thereby in a position to compete effectively with installers employing automatic machines that cost about ten times as much.

Still another object of the invention is to allow use of hand-held, lightweight seam welding guns to produce seams between flooring sheets of a quality that has heretofore been attainable only with heavy, bulky, automated seam sealing machines having only limited maneuverability.

In one broad aspect the present invention may be considered to be a device for sealing seams between adjoining sheets of flooring comprising a portable seam sealing welding gun having a body with a longitudinal axis and an elongated, heat conducting element projecting from the body along the longitudinal axis. The device employs a heat concentration nose mounted on the heat conducting element and having a narrow heating post projecting from the heat conducting element at an angle of at least five degrees relative to the longitudinal axis. The device also includes a hollow welding tip mounted on the heating post. The welding tip includes a weld rod receiving tube which terminates in a melting chamber having an elongated mouth with forward and rearward extremities. The tip defines a upturned toe in front of the forward extremity of the mouth. The tip further defines a separate duct in communication with the melting chamber and terminating in a orifice located behind the rear extremity of the mouth.

Preferably the heating post is mounted at an angle of at least about fifteen degrees relative to the longitudinal axis. Also, the upturned toe is preferably configured with a concave underside that defines a downwardly facing channel therebeneath leading to and in communication with the mouth of the melting chamber.

A stabilizing guide is also preferably provided to support the hand-held welding gun. The guide includes an elongated arm that is coupled to a collar that is disposed about the welding gun body. The guide arm is secured to the collar by a releasable joint that allows the welding gun to be supported above the stabilizing guide at a selected orientation relative to the sheets of flooring. The guide employs laterally spaced rollers that laterally stabilize the welding gun and prevent it from tipping from side to side while the locked arm of the stabilizing guide holds the welding gun at an appropriate angle of orientation. A consistent, firm bond is thereby achieved between the bead of the sealant extruded and the facing edges of the sheets of flooring to be joined together.

In another broad aspect the invention may be considered to be a device for sealing seams between flooring sheets wherein the flooring sheets have adjacent edges that abut and are configured to form a linear, concave, upwardly facing channel where they meet. The device is comprised of a portable, hand-held welding gun having a body defining a longitudinal axis and a heat conducting metal nose cap with an elongated melting tip mounting post projecting linearly therefrom. According to the invention a stabilizing carriage is provided for the welding gun. The stabilizing carriage has a pair of laterally separated rollers disposed on opposite sides of the welding gun and a track follower centered beneath the welding gun to follow the linear channel formed at the adjacent edges of the flooring sheets. An adapter means is provided for securing the welding gun to the stabilizing carriage to hold the welding gun at a selected orientation relative to the flooring sheets as the carriage rolls across them.

The stabilizing carriage is preferably comprised of an elongated carriage arm having front and rear ends. The front end of the carriage arm is joined to the adapter means. The rear end of the carriage arm includes laterally projecting branches. The carriage is further comprised of a carriage axle upon which the laterally separated rollers and the track follower are mounted. The track follower is preferably comprised of a ring projecting radially from the carriage axle so as to ride in the concave, upwardly facing channel where the flooring sheets meet.

The adapter means is preferably comprised of an annular collar that fits about the body of the welding gun. The adapter includes a releasable and rotatably adjustable connector that is attachable to the forward end of the carriage arm to releasably lock the carriage arm at a selected orientation relative to the annular collar. This releasable and adjustable connector is preferably comprised of a transversely oriented bolt.

The adapter means is further preferably comprised of an angular orientation location mechanism for locating the collar on the welding gun body in an angular orientation relative thereto such that the releasable and adjustable connector resides directly beneath the welding gun body.

The invention may be described with greater clarity and particularity by reference to the accompanying drawings.

DESCRIPTION OF THE DRAWINGS

FIG. 1 is a side elevation of one embodiment of a view hand-held apparatus for sealing seams between adjacent sheets of flooring employing the heat welding accessories of the invention.

FIG. 2 is bottom plan view of the apparatus of FIG. 1.

DESCRIPTION OF THE EMBODIMENTS

Figure 10:
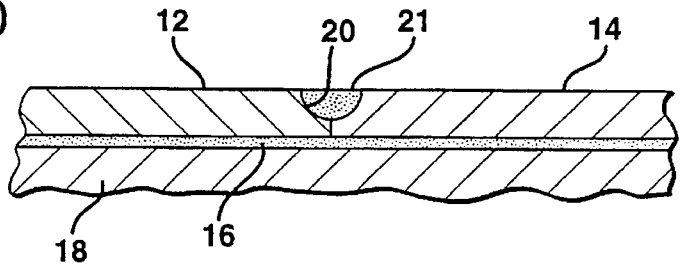
FIG. 10 is a transverse sectional detail illustrating adjoining sheets of flooring that have been sealed together using the apparatus of the invention.

FIGS. 1 and 2 illustrate a device indicated generally at 10, constructed according to the invention, for sealing seams between adjacent sheets of linoleum flooring, depicted at 12 and 14 in FIG. 10. As shown in that drawing figure the linoleum flooring sheets 12 and 14 are secured by a conventional layer of substrate linoleum adhesive 16 to a subfloor 18 of plywood or concrete therebeneath. The adjoining edges of the adjacent sheets 12 and 14 reside in abutting relationship and define an upwardly facing, elongated groove 20 where they meet. Very typically the groove 20 thus formed has a semicircular cross section as illustrated.

The apparatus 10 shown in FIGS. 1 and 2 is comprised of a conventional Liester Triac model portable, hand-held floor seam welding gum shown at 22 augmented by the accessories of the invention. The see welding gun 22 has a body 24 of generally cylindrical configuration. The body 24 defines a longitudinal axis indicated at 26. The welding gun 22 is powered by commercially available alternating current through a power supply cord 28. Near its front end the outer case of the see welding gun body 24 defines a pair of diametrically opposed, radially outwardly projecting lugs 32. The lugs 32 have a rectangular configuration as illustrated. Heat is produced by electrical resistance and is transmitted along a narrower, cylindrical, heat conducting member 30 that projects from the body 24 along the longitudinal axis 26.

A heat concentration nose 34 is mounted on the end of the heat conducting member 30. The nose 34 is formed of a thermally conductive metal, such as brass or copper or a copper alloy. The nose 34 includes a cap 36 of a generally frustoconical configuration. At the base of the cap 36 the nose 34 includes a semicircular skirt 38, with a longitudinal radial slot defined therein to provide an expansion slot. The skirt 38 is of a generally C-shaped configuration with radially outwardly projecting ears that may be squeezed together by means of a machine screw 40. The nose 34 is thereby releasably secured to the cylindrical, heat conducting member 30 at a selected position of angular orientation relative thereto by fitting the cap 36 on the end of the heat conducting member 30 with the screw 40 loosened, rotating the nose 34 to the desired orientation, and tightening the screw 40 so as to clamp the skirt 38 firmly against the outside wall of the heat conducting member 30.

The heat concentration nose 34 also includes a tubular heating tip mounting post 42 that projects at an angle of at least five degrees, and preferably greater than fifteen degrees from the longitudinal axis 26 of the welding gun body 24. The heating tip mounting post 42 may, for example, be oriented at an angle of eighteen degrees relative to the longitudinal axis 26. The nose 34 is oriented on the heat conducting member 30 so that the heating tip mounting post angles downwardly from the axis 26 and lies in the same vertical plane therewith.

Figure 5:
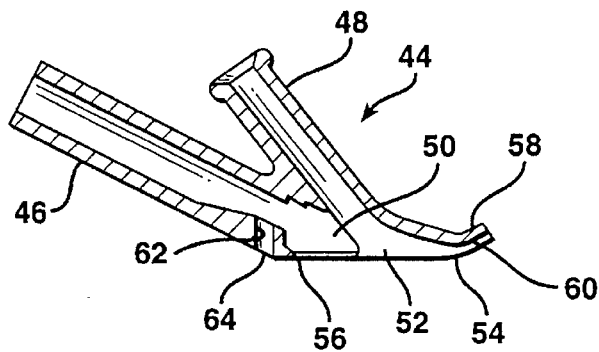
FIG. 5 is a side sectional view of one embodiment of a hollow heating tip that can be utilized with the devices of FIGS. 1–4.

A hollow heating tip 44 is disposed on the heating tip mounting post 42 as illustrated in FIG. 1. The heating tip 44 is formed of a highly thermally conductive metal, such as a copper alloy. The hollow heating tip 44 is shown in isolation in FIGS. 5 and 6. The hollow heating tip 44 includes a tubular sleeve 46 of cylindrical, annular cross section which fits onto the heating tip mounting post 42.

Figure 6:
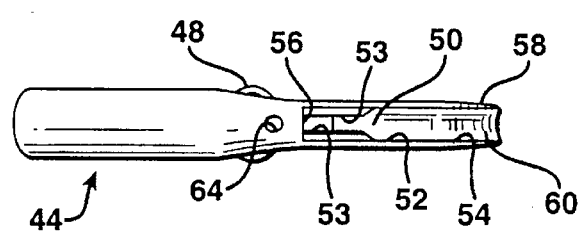
FIG. 6 is a bottom plan view of the hollow heating tip of FIG. 5.

Above and forwardly from the tubular mounting sleeve 46 the heating tip 44 forms a welding rod receiving tube 48, which may also be of cylindrical, annular cross section. The welding rod receiving tube 48 leads down into and terminates in a cavity within the structure of the heating tip 44 that serves as a melting chamber, indicated at 50. The melting chamber 50 has a open, downwardly facing, elongated, molten sealant dispensing mouth 52 with a front extremity 54 and a rear extremity 56. As illustrated in FIG. 6, the front portion of the mouth 52 adjacent the front extremity 54 thereof is wider than the rear portion of the mouth 52 adjacent the rear extremity 56 thereof due to the additional thickness of the melting chamber side walls, indicated at 53.

The hollow heating tip 44 also defines a forwardly directed toe 58. A significant improvement of the invention is a small but highly important change in the structure of the toe 58 from conventional heating tip designs. Specifically, the toe 58 is upturned at its forward extremity remote from the mouth 52 and is formed with a concave, downwardly facing groove 60 that leads to and is longitudinally aligned with the mouth 52 of the melting chamber 50.

Another important change in the structure of the heating tip 44 is the provision of a heating duct 62. The heating duct 62 extends between the melting chamber 50 and an orifice 64 located behind the rear extremity 56 of the heating chamber mouth 52. The heating duct 62 is quite important since it serves as a passageway through which thermal energy passes to preheat the adjoining edges of the linoleum flooring sheets 12 and 14 just before the molten thermoplastic sealant is introduced into the channel 20 at the upper surfaces of the linoleum sheets 12 and 14 at the abutting edges thereof. By preheating the linoleum surfaces forming the channel 20, significantly improved bonding between the bead of thermoplastic sealant 21 and the linoleum sheets 12 and 14 is achieved.

In addition to the specially configured heating tip 44, the invention also provides the apparatus 10 with a mobile, stabilizing guide which serves as a carriage and is indicated generally at 66. The stabilizing guide 66 is constructed with a elongated stem or arm member 68.

The elongated carriage arm 68 has a forward end 70 and an opposite rearward end. The forward end 70 of the carriage arm 68 is formed with a transverse bore therethrough. The forward stem end 70 is thereby formed into a closed ring. The rearward end of the arm member 68 is divided into forked branches 72 and 74 that extend rearwardly and laterally outwardly at right angles relative to each other to form a yoke. The rearward, terminal ends of the branches 72 and 74 are formed with apertures therethrough that receive the ends of a cylindrical axle 76. The axle 76 is equipped with a central hub, secured to the trailing ears of the branches 72 and 74 by bolts 78, and an outer drum with internal bearings that allow the drum to rotate on the hub.

The outer drum of the axle 76 carries a pair of laterally separated roller element 80 and 82 near its outboard ends. At the center of the outer drum of the axle 76 there is a track follower 84 in the form of an annular ring disposed on the axle 76 to project radially outwardly therefrom, midway between the rollers 80 and 82. The width of the track follower 84 is such that it fits into the channel 20 defined between the abutting edges of the linoleum sheets 12 and 14. The common axle 76 is thereby rotatably attached to the forked end of the carriage arm 68 to carry the roller elements 80 and 82 and the central rolling ring 84 in coaxial alignment with each other.

The apparatus 10 also includes an adapter 86 for releasably securing the welding gun body 24 to the welding gun carriage or stabilizing guide 66. The adapter 86 holds the welding gun 22 at a selected orientation relative to the sheets of flooring 12 and 14.

The adapter 86 is formed with a cylindrical, annular collar 87 fitted coaxially onto the cylindrical body 24 of the seam sealing welding gun 22. The collar 87 is provided with a pair of radially projecting ears 88 having transverse, coaxially aligned, circular apertures therethrough. The closed ring at the front end 70 of the carriage stem 68 fits snugly between the ears 88 and may be clamped relative thereto by means of a bolt assembly 90.

The bolt assembly 90 may be tightened or loosened to releasably secure the welding gun carriage 66 relative to the collar 87 so as to hold the welding gun 22 at a selected angular orientation relative to the flooring sheets 12 and 14, as viewed from the side as shown in FIG. 1. That is, the bolt assembly 90 can be loosened to allow the front end 70 of the carriage stem 68 to be raised or lowered relative to the flooring sheets 12 and 14, and retightened to firmly clamp the stabilizing guide 66 in a selected orientation relative to the collar 87. The orientation of the carriage stem 66 relative to the collar 87 controls the angle of fore and aft inclination of the welding gun axis 26 relative to the flooring sheets 12 and 14.

It should be noted that the collar 87 is provided with a pair of rectangular-shaped notches 92 diametrically opposed to each other and angularly displaced from the space between the ears 88 by ninety degrees. The notches 92 are of a size and shape to snugly receive the radially projecting lugs 32 on the outside of the body 24 of the seam sealing welding gun 22. The lugs 32 on the welding gun body 24 and the notches 92 in the adapter collar 87 thereby serve as mutually complementary locator means for consistently positioning the collar 87 at a predetermined position of angular orientation relative to the welding gun body 24.

The engagement of the lugs 32 in the notches 92 ensures that the releasable joint formed by the collar ears 88 and the front end 70 of the carriage stem 68 consistently resides directly beneath the longitudinal axis 26 of the welding gun body 24. This, in turn, ensures that the seam follower ring 84 likewise consistently resides directly beneath the longitudinal axis 26 of the welding gun body 24. As best illustrated in FIG. 2, it is evident that the seam follower 84 and the longitudinal welding gun axis 26 reside in the same vertical plane once the collar 87 has been positioned properly on the welding gun body 24 as shown in FIG. 1 and the bolt assembly 90 has been tightened.

Figure 3:
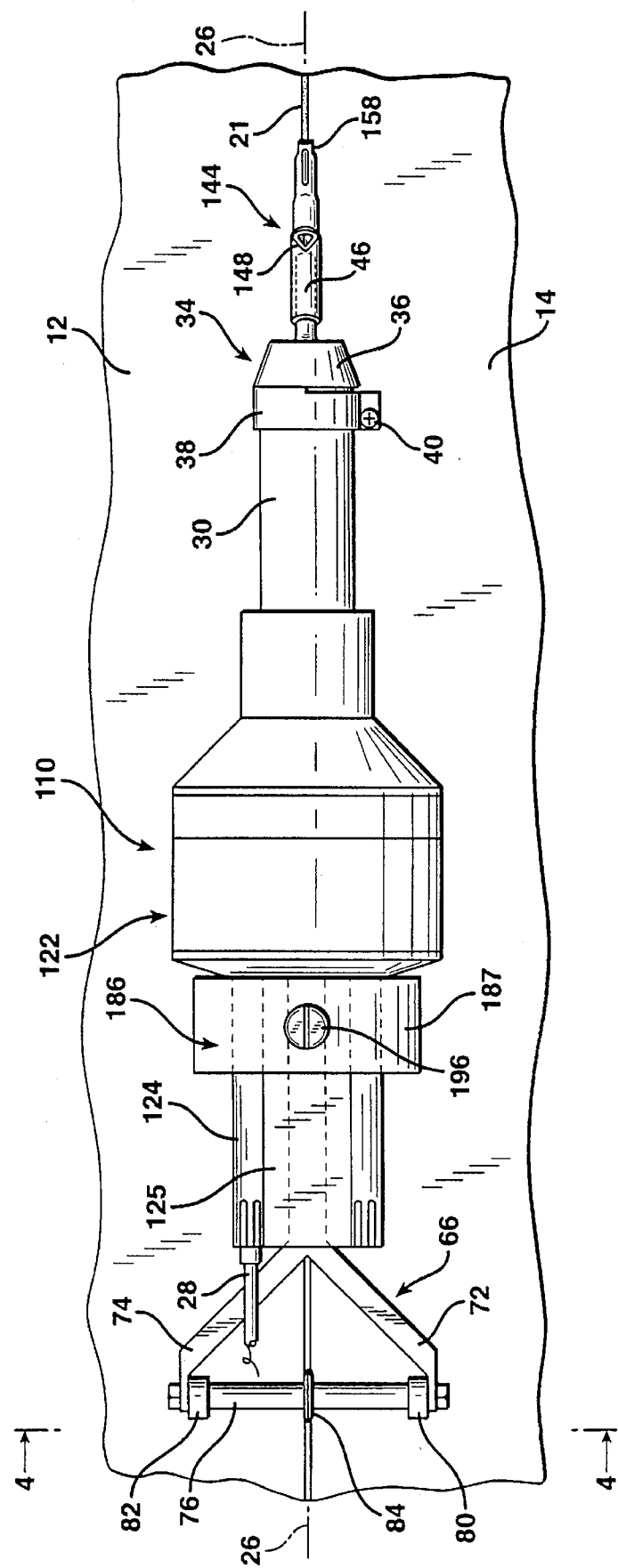
FIG. 3 is a top plan view of an alternative embodiment of a hand-held device for sealing seams between flooring sheets which employs the heat welding accessories of the invention.
Figure 4:
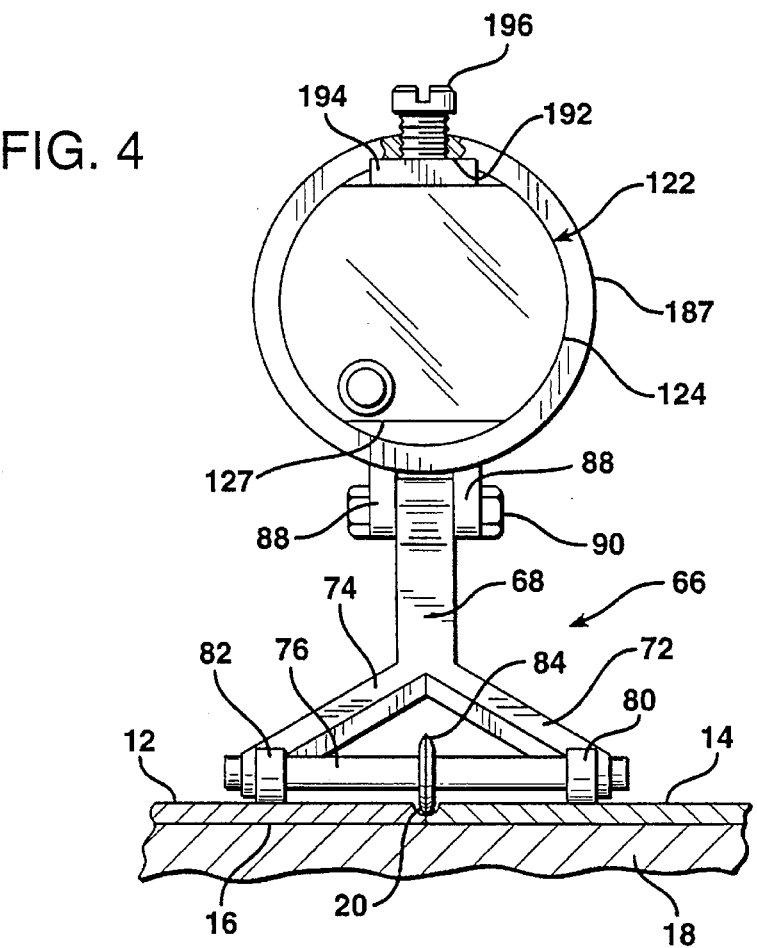
FIG. 4 is a sectional elevational taken along the lines 4—4 of FIG. 3.

FIGS. 3 and 4 illustrate generally at 110 an alternative device for sealing seams between flooring sheets 12 and 14. The device 110 is similar in many respects to the apparatus 10, and parts common to both bear the same reference numbers. However, there are some differences.

In the apparatus 110 the portable, hand-held seam sealing gun 122 that is employed is a Zinzer model K5.16R. The seam sealing gun 122 has a body 124 with an outer surface that is generally cylindrical in configuration, but which is formed with a flat, planar face 125 on its top. Also, the body 124 of the seam sealing gun 122 does not include the radially projecting lugs 32 that are characteristic of the seam sealing gun 22 shown in FIGS. 1 and 2.

The adapter 186 that is used to secure the carriage 66 to the seam sealing gun 122 is altered slightly in configuration from the adapter 86. The adapter 186 is likewise constructed as a cylindrical, annual collar 187 including clamping ears 88. However, the adapter 186 does not include the notches 92, but rather is formed with a radial channel 192 in its inner surface diametrically opposite the ears 88, as shown in FIG. 4. The adapter 186 also includes an internally tapped, radial bore formed through the structure of the wall of the collar 187 at the radial channel 192.

The adapter 186 is further comprised of a rectangular block 194, visible in FIG. 4. The block 194 seats in the radial channel 192 in the collar 187 and against the flat, upper face 125 of the welding gun body 124.

A set screw 196 is engaged in the tapped, radial bore in the collar 187. The set screw 196 thereby clamps the rectangular block 194 against the face 125 of the body 124 of the welding gun 122. When the set screw 196 is tightened, the space between the ears 88, and hence the front end 70 of the carriage stem 68, are thereby held centered directly beneath the welding gun body 124 and in vertical alignment with the welding gun body axis 26.

One other difference in the device 110 depicted in FIGS. 3 and 4 from that depicted in FIGS. 1 and 2 is the construction of the welding tip 144. Like the welding tip 44, the welding tip 144 has a cylindrical, annular sleeve 46 that fits onto the narrow, tubular heating post 42 of the heat concentration nose 34. Also, the welding tip 144 includes a melting chamber 150 and an elongated mouth 152. The elongated mouth 152 has a forward extremity 154 and a rearward extremity 156. As in the heating tip 44, the heating tip 144 includes an upturned toe 158 with a groove 160 located forward of the front extremity 154 of the dispensing mouth 152.

As in the tip 44, the tip 144 includes a preheating duct 162 leading from an orifice 164 behind the rear extremity 156 of the dispensing mouth 152. The preheating duct 162 is in communication with the melting chamber 150. The preheating duct 162 enables the groove 20 at the interface of adjacent floor sheets 12 and 14 to be filled with sealant to be preheated as the device is moved rearwardly.

Figure 7:
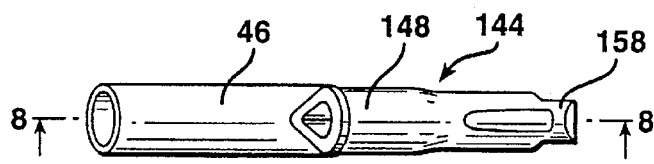
FIG. 7 is a top plan view of an alternative hollow heating tip that can be utilized with either of the portable seam welding guns depicted in FIGS. 1–4.
Figure 8:
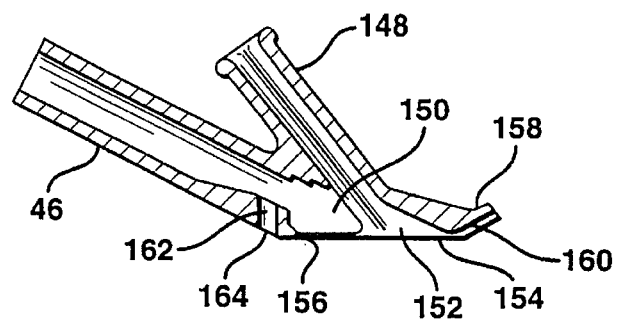
FIG. 8 is a side sectional view of the hollow heating tip of FIG. 7.

The upwardly directed welding rod receiving tube 148 of the welding tube 144 differs from the tube 48 of the welding tip 44 in that it is of a generally triangular configuration, as is evident in FIG. 7. Thus, while the welding rod receiving tube 148 of the welding tip 44 is able to receive and accommodate one style of welding rod, namely a welding rod of circular cross section, the welding rod receiving tube 148 accommodates the other commercially available style of welding rod. Specifically, the welding rod receiving tube 148 accommodates welding rods of generally triangular configuration, which are sometimes termed in the trade "half round" welding rods.

Figure 9:
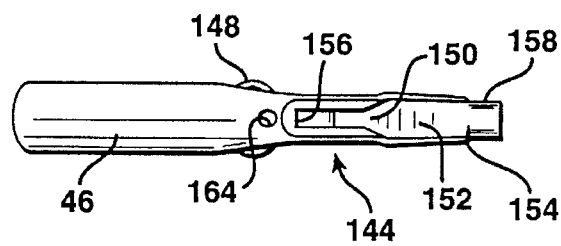
FIG. 9 is a bottom plan view of the hollow heating tip of FIG. 7.

The other major difference between the welding tips 144 and 44 is that the rear portion of the dispensing mouth 152 adjacent the rear extremity 156 thereof is considerably narrower than the forward portion of the dispensing mouth 152 adjacent the forward extremity 154 thereof, as illustrated in FIG. 9.

The devices 10 and 110 are employed in the same manner irrespective of which type of welding tip is utilized. The welding tips 44 and 144 may be used interchangeably with either of the portable welding guns 22 and 124. The election of the welding tip to be employed is in the discretion of the installer, depending upon whether a welding rod of circular or triangular cross section is to be employed.

To operate the devices 10 and 110 the flooring installer first determines the proper angle at which the axis 26 of the welding gun body 24 should reside relative to the flat, adjacent floor sections 12 and 14. Due to the angle of the welding tip mounting post 42 relative to the longitudinal axis 26 of the welding gun, the welding gun 10 or 110 need not be held at nearly such a great angle to the floor as would otherwise be the case. This is because the angle of the welding tip mounting post 42 relative to the longitudinal axis 26 allows the welding gun 22 or 122 to be operated at a lower angle relative to the floor. This facilitates manipulation of the device.

Once the desired angle of inclination of the longitudinal axis 26 relative to the floor has been determined, the bolt assembly 90 is loosened and the rear of the body of the welding gun 22 or 122 is raised while pressing the central rolling follower ring 84 of the carriage assembly 66 into the groove 20 formed between adjacent flooring sections 12 and 14. The bolt assembly 90 is then retightened so that the carriage 66 will maintain the welding gun in the selected fore and aft angle of inclination. Electrical power is then supplied to the welding gun 22 or 122 and a welding rod of fusible, thermoplastic material is inserted into the welding rod receiving tube 48 or 148 with the mouth of the selected tip 44 or 144 positioned directly over the groove 20 to be filled with sealant. The welding gun is then pulled rearwardly while maintaining the rolling follower ring 84 in the groove 20 between the adjoining flooring sheets 12 and 14. The rollers 80 and 82 provide lateral stability to the device to prevent it from tipping to one side or the other and to hold it so that the center of the welding gun body 24 or 124 lies in the same vertical plane as the groove 20 at the interface of the flooring sheets 12 and 14. The follower ring 84 also helps guide the device so that the mouth of the welding tip remains over the channel 20.

Thermoplastic sealant is fed through the welding rod receiving tube 48 or 148 of the selected welding tip as the welding gun is pulled rearwardly, from right to left as viewed in FIGS. 1–3. This allows a smooth, even flow of molten thermoplastic material into the groove 20. This material quickly hardens to form a thermoplastic sealing bead 21 that bonds to the surfaces of the flooring sheets 12 and 14 in the channel 20 that it contacts. The plastic, sealing bead 21 thereby firmly bonds the adjoining edges of the flooring sheets 12 and 14 together so that they will not separate even if the bond of the adhesive 16 therebeneath is inadequate to firmly hold the edges of the flooring sheets 12 and 14 to the floor 18.

By pulling the seam sealing devices 22 and 122 rearwardly, some of the heat generated within the welding chamber 50 or 150 serves to preheat the surfaces of the floor sheets 12 and 14 that form the channel 20. This preheating is achieved since the preheating duct 64 or 164 passes longitudinally along the groove 20 and heats the groove 20 just before the molten bead of sealant is dispensed into the groove 20. This enhances the bond formed by the sealant bead 21 with the surfaces of the flooring sheets 12 and 14 that it contacts. Also, since each welding tip is equipped with an upturned toe having a downwardly facing, concave groove defined in its underside, the shape of the bead 21 is such that it tends to flow more directly into the channel 20, and is not spread laterally along the horizontal surfaces of the sheets of flooring 12 and 14 adjacent the channel 20.

Figure 11:
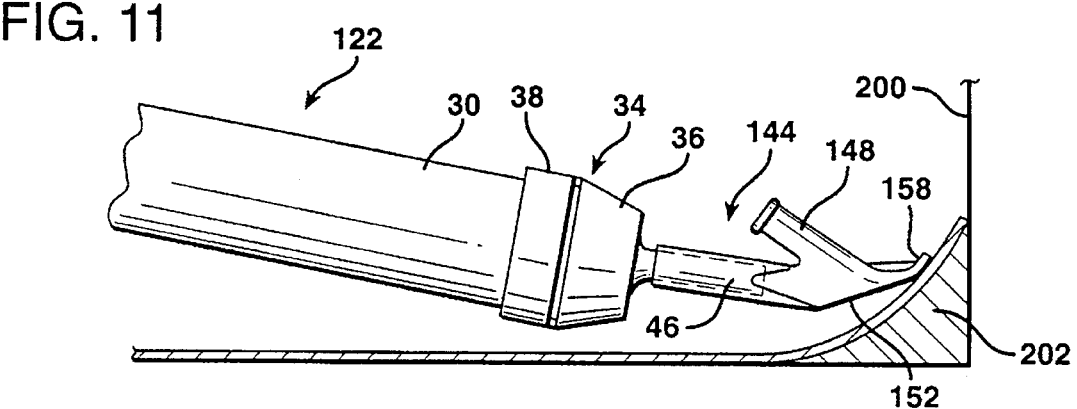
FIG. 11 illustrates an alternative manipulation of the device of the invention for use in sealing adjacent sheets of flooring where they meet a wall.

The angle of the welding tip mounting post 42 relative to the longitudinal axis 26 of the welding gun body also provides an additional advantage when performing sealant welds where the linoleum sheets 12 and 14 are coved concave upwardly as illustrated in FIG. 11. Very typically, coving strips 202 having the cross sectional configuration depicted in FIG. 11 are used to support the edges of the sheets 12 and 14 of flooring at intersections with walls 200. To achieve good sealant bonds at these locations the heat concentration nose 34 is loosened from the heat conducting member 30 and turned a full one hundred eighty degrees thereon. The screw 40 is then retightened, this time on the opposite side of the heat conducting member 30. Because the heating tip mounting post projects at an angle of about eighteen degrees from the longitudinal axis 26 of the welding gun body, the welding tip 44 or 144 will be canted upwardly, as illustrated in FIG. 11. This greatly facilitates the application of a bead of sealant into the channel 20 adjacent the flooring sheets 12 and 14 in cove areas where the linoleum sheets 12 and 14 curve upwardly to intersect an upright wall 200.

The Zinser and Leister seam sealing welding guns are the two devices that are most widely commercially available. Although these devices both have bodies, at least portions of which are cylindrical, there are some differences in the outer surface configurations of the bodies of these two seam welding guns.

The body 24 of the Leister seam welding gun 22 is actually not cylindrical, but is tapered slightly and decreases slightly in diameter from its front in the region of the lugs 32 toward its rear where the cord 28 is attached. The diameter of the body 24 in the region from which the lugs 32 project is about 66 millimeters.

The Zinser seam welding gun 122 has a body 124 which has an outer surface that is generally cylindrical in configuration with a pair of diametrically opposed, flat faces 125 and 127 defined thereon. The flat face 125 resides at the very top of the seam gun welding body 124, while the flat face 127 is centered directly vertically beneath. Unlike the Leister seam welding gun, the Zinser welding gun body 124 tapers but narrows very slightly from its rear end where the electrical cord 28 is attached toward the front end where the adapter 186 seats as depicted in FIG. 3. The diameter of the body 124 in this region is approximately 57 millimeters. As is evident, the nominal diameter of the Zinser seam welding gun body 124 is somewhat smaller than the nominal diameter of the Leister seam welding gun body 24.

Figure 12:
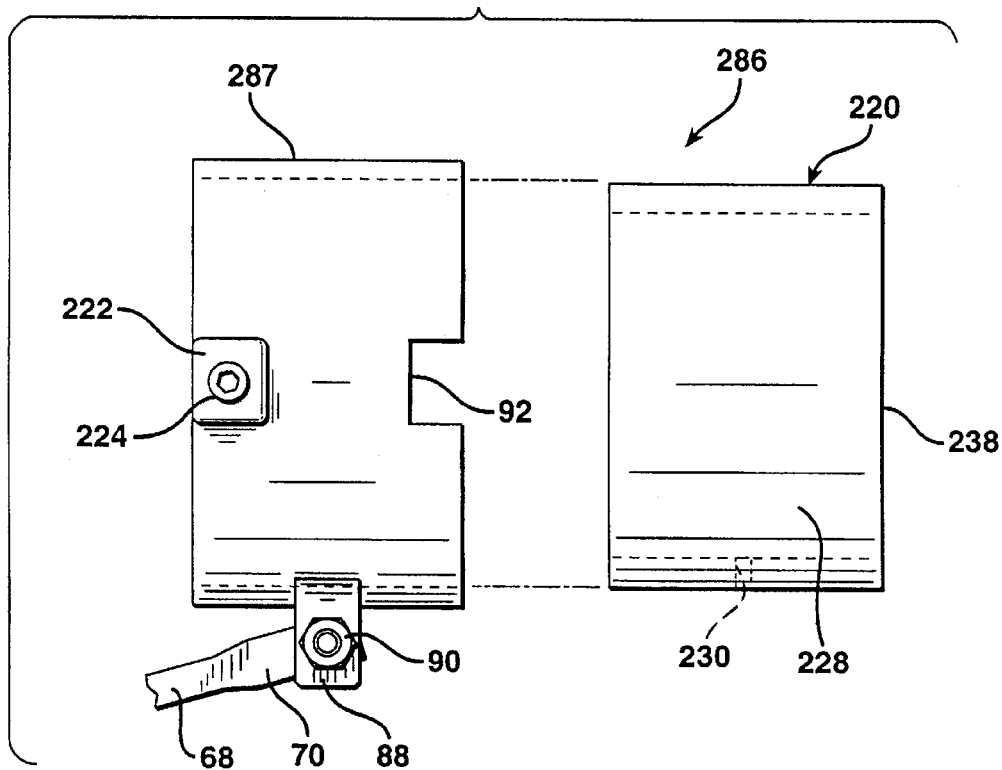
FIG. 12 illustrates an alternative embodiment of an adapter to those depicted in FIGS. 1–4.
Figure 13:
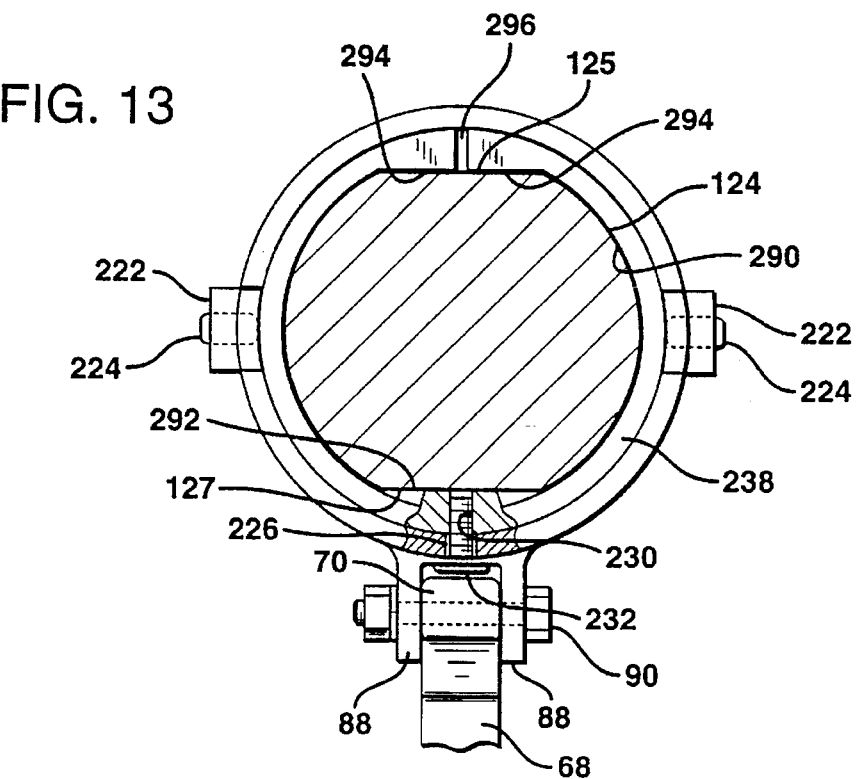
FIG. 13 is a transverse sectional view, partially broken away, illustrating use of the adapter of FIG. 12 on the seam sealing gun body of FIGS. 3 and 4.
Figure 14:
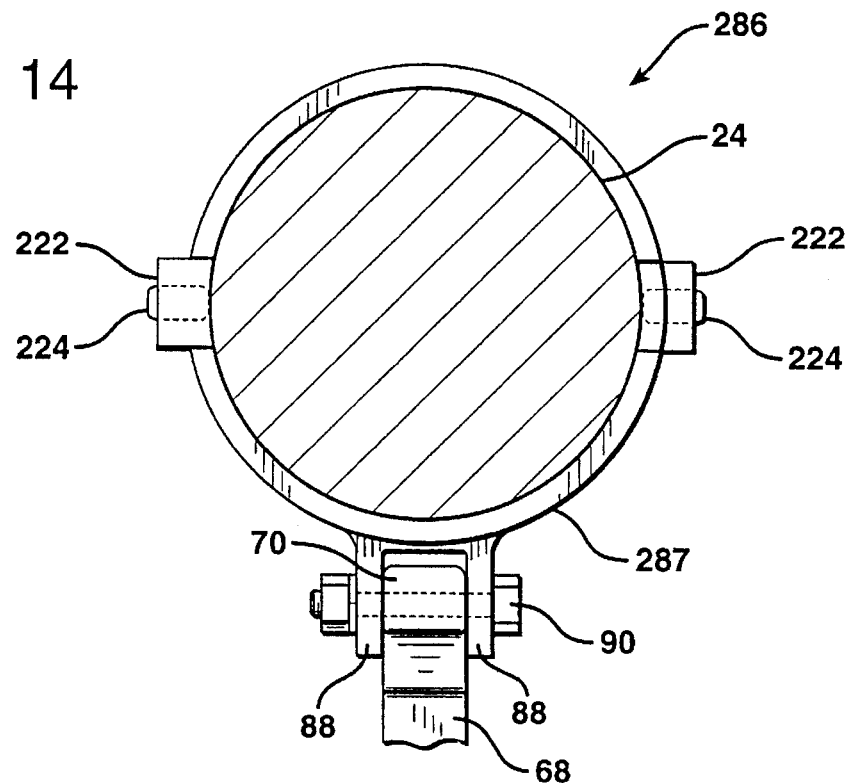
FIG. 14 is a transverse sectional view illustrating use of the adapter of FIG. 12 on the seam sealing gun body of FIGS. 1 and 2.
Figure 15:
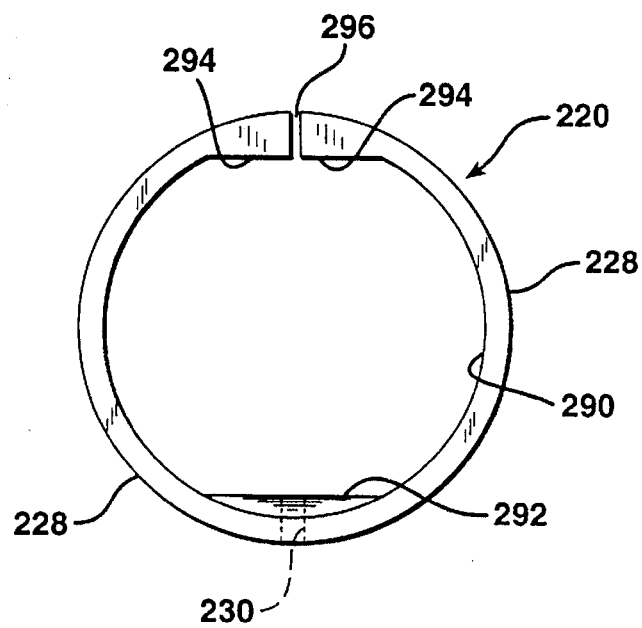
FIG. 15 is an isolated, transverse view of the sleeve insert of the adapter of FIG. 12.

FIGS. 12 through 15 illustrate a further embodiment of an adapter according to the invention which may be utilized with either of the seam welding guns 22 and 122. Specifically, FIGS. 12 and 13 illustrate an adapter 286 which is comprised of both a collar 287, similar in many respects to the collar 87 of the adapter 86, and a longitudinally split sleeve 220. As illustrated in FIGS. 12 and 13, the longitudinally split sleeve 220 fits coaxially within the collar 287, and is removable therefrom.

The collar 287 has a generally cylindrical outer surface with a pair of diametrically opposed notches 92 defined therein, and a pair of ears 88 projecting downwardly therefrom. The space between the ears 88 is angularly displaced from the notches 92 by ninety degrees. The ears 88 receive the ring at the end 70 of the stem 68 as in the other embodiments of the invention depicted.

The collar 287 differs from the collar 86 in that it is provided with a pair of compression screw pedestals 222 that are longitudinally aligned with the notches 92. The pedestals 222 include tapped, radial apertures therethrough and through the structure of the collar 287 to accommodate externally threaded compression screws 224. The compression screws 224 are coaxially aligned with each other and are directed radially inwardly toward the center of the opening through the collar 287. As shown in the broken away portion of FIG. 13, the collar 287 also includes a smooth-walled, radial opening 226 defined through its structure directly between the ears 88.

The interior diameter of the inner, concave, cylindrical wall of the collar 287 is preferably 66 millimeters. The longitudinally split sleeve 220 is depicted in isolation in an end view in FIG. 15. The sleeve 220 has a cylindrical, outer surface 228 that fits snugly within the opening within the annular collar 287. The sleeve 220 also has an inner cylindrical surface 290 shaped to conform to the outer surface of the body 124 of the welding gun 122. That is, the interior surface 290 of the sleeve 220 is generally cylindrical, formed having a diameter of about 57 millimeters. However, the surface 290 is flattened at both the top and the bottom to form a single, lower, flat surface 292 and a pair of upper, flat surfaces 294 on each side of the longitudinal gap 296 that defines the split in the sleeve 220. Also, the sleeve 220 defines an internally tapped, threaded bore 230 through its wall. The bore 230 resides in diametrical opposition to the gap 296 and extends from the convex, cylindrical, outer surface 228 of the sleeve 220 to the lower, flat, inner surface 292 thereof.

As illustrated in FIG. 13, the adapter 286 is provided with an anchoring machine screw 232. When the sleeve 220 is to be utilized as an accessory to the collar 287, it is inserted longitudinally, coaxially within the cylindrical opening of the collar 287. The bolt 90 is temporarily removed and the ring at the end 70 of the stem 68 is withdrawn from between the ears 88. This allows the screw 232 to be inserted into the opening 226 in the collar 287. The internally tapped opening 230 in the sleeve 220 resides in coaxial alignment with the opening 226 in the collar 287 when the sleeve 220 has been correctly inserted into the collar 287. The shank of the anchoring machine screw can then be inserted radially inwardly through the opening 226 in the collar 287. The machine screw 232 can then be tightened to threadably engage its shank in the tapped opening 230 of the sleeve 220. This connection anchors the sleeve 220 within the confines of the collar 287. The ring at the end 70 of the stem 68 is then again inserted between the ears 88 and the bolt 90 reinstalled in the manner illustrated in FIG. 13.

With the sleeve 220 installed within the collar 287, the adapter 286 is configured to receive the body 124 of the seam welding gun 122 therewithin. That is, the electrical cord 28 is threaded through the central, longitudinal opening of the sleeve 220 and the adapter 286 is inserted onto the seam sealing gun body 124 from the rear. The inner, forward edge 238 of the sleeve 220 is internally chamfered so as to facilitate insertion of the body 124 into the opening of the sleeve 220.

The cylindrical portion of the interior surface 290 of the sleeve 220 snugly receives the cylindrical portion of the body 124, while the lower, flat surface 292 of the interior surface 290 of the sleeve 220 conforms to the lower, flat surface 127 of the sealing gun body 124. Similarly, the flat surfaces 294 at the top of the interior surface 290 of the sleeve 220 conform to the top, flat surface 125 of the sealing gun body 124.

Because the sleeve 220 is longitudinally split by the gap 296, it can be spread sufficiently to pass over the slightly larger diameter of the rear of the sealing gun body 124 forwardly until it abuts the enlarged, drum-shaped portion of the seam sealing gun 122. At this point the compression screws 224 in the pedestals 222 of the outer, surrounding collar 297 are tightened, thereby narrowing the gap 296 and tightly clamping the sleeve 220 against the outer surface of the seam sealing gun body 124. This longitudinally immobilizes the adapter 286 relative to the seam sealing gun body 124, and permits use of the device in the manner previously described.

The adapter 286 is considerably more versatile than either the adapter 86 or the adapter 186 because it may be utilized with either the seam sealing gun 22 or the seam sealing gun 122. To employ the adapter 286 with the seam sealing gun 22, the sleeve 220 is merely removed. This is accomplished by temporarily removing the bolt 90 and then withdrawing the end 70 of the carriage stem 68 from between the ears 88. The anchoring screw 232 is thereupon unscrewed. This allows the user to slide the sleeve 220 longitudinally in the manner depicted in FIG. 12 from within the confines of the collar 287. The stem 68 and bolt 90 are thereupon reinstalled onto the collar 287. The adapter 286 may then be used to confine and grip the body 24 of the seam sealing gun 22 in the manner depicted in FIG. 14. If desired the compression screws 224 may be tightened against the outer surface of the seam sealing gun body 24 to both prevent any relative rotation and longitudinal movement therebetween.

A carriage 66 equipped with an adapter 286 represents a highly versatile embodiment of the invention, since it permits the same basic adapter structure to be utilized alternatively and interchangeably with both of the most widely commercially utilized seam sealing guns currently available. Insertion and installation of the sleeve 220 within the collar 287 and the detachment and removal of the sleeve 220 from the collar 287 may be performed in a matter of seconds.

Undoubtedly, numerous other variations and modifications of the invention will become readily apparent to those familiar with the installation of flooring sheets. Accordingly, the scope of the invention should not be construed as limited to the specific embodiments depicted and described.

I claim:

1. A device for sealing seams between adjoining sheets of flooring comprising:

a portable, hand-held seam sealing welding gun having a body with a longitudinal axis and an elongated, heat conducting element projecting from said body along said longitudinal axis, a heat concentration nose mounted on said heat conducting element and having a narrow heating post projecting from said heat conducting element at an angle of at least five degrees relative to said longitudinal axis, and a hollow welding tip mounted on said heating post and including a welding rod receiving tube which terminates in a melting chamber having an elongated, open mouth with forward and rearward extremities and wherein said tip defines an upturned toe in front of said forward extremity of said mouth and said tip further defines a separate duct in communication with said melting chamber and terminating in an orifice located behind said rear extremity of said mouth.

2. A device according to claim 1 wherein said heating post is oriented at an angle of at least about fifteen degrees relative to said longitudinal axis.

3. A device according to claim 1 wherein said upturned toe is configured with a concave underside that defines a downwardly facing channel therebeneath in communication with said mouth of said melting chamber, and said elongated mouth is narrower at its rearward extremity then at its forward extremity.

4. A device according to claim 1 further comprising:

a welding gun carriage having a pair of laterally separated stabilizing roller elements and a central rolling ring mounted midway between said stabilizing roller elements, and adapter means for releasably securing said welding gun body to said welding gun carriage to hold said welding gun at a selected orientation relative to said sheets of flooring.

5. A device according to claim 4 wherein said welding gun carriage is further comprised of an elongated stem member that has a forked end and an opposite end, and further comprising a common axle at said forked end to carry said central rolling ring and said stabilizing roller elements, and said opposite end of said elongated stem is fastened to said adapter means by a releasable bolt oriented transversely relative to said longitudinal axis of said welding gun body.

6. A device according to claim 5 wherein said welding gun body has a pair of diametrically opposed lugs on its outer surface and said adapter means is comprised of an annular collar with a pair of diametrically opposed notches therein that snugly receive said lugs so as to hold said hinged end of said stem centered directly beneath said welding gun body.

7. A device according to claim 6 wherein said welding gun body has an outer surface that is generally cylindrical in configuration with a pair of diametrically opposed flat faces defined thereon, and wherein said adapter is further comprised of a longitudinally split sleeve having a cylindrical outer surface that fits snugly within said annular collar, and an inner surface shaped to conform to said outer surface of said welding gun body, anchoring means for releasable securing said sleeve within said collar, and radial compression means on said collar for squeezing said sleeve against said outer surface of said welding gun body.

8. A device according to claim 5 wherein said welding gun body is generally cylindrical with at least one flat face defined on the outer surface thereof and said adapter means is comprised of an annular collar formed with a radial channel in its inner surface, with an internally tapped radial bore formed through its structure at said radial channel, and said adapter means is further comprised of a rectangular block that seats in said radial channel in said collar and against said flat face on said welding gun body, and a set screw engaged in said tapped radial bore in said collar, wherein said set screw clamps said rectangular block against said body of said welding gun and thereby holds said opposite end of said stem centered beneath said welding gun body.

9. A device for sealing seams between flooring sheets wherein said flooring sheets have adjacent edges that abut and are configured to form a linear, concave, upwardly facing channel where they meet comprising:

a portable, hand-held welding gun having a body defining a longitudinal axis and a heat conducting metal nose cap with an elongated melting tip mounting post projecting linearly therefrom, a stabilizing carriage for said welding gun having a pair of laterally separated rollers disposed on opposite sides of said welding gun and a track follower centered beneath said welding gun to follow said linear channel formed at said adjacent edges of said flooring sheets, and adapter means for securing said welding gun to said stabilizing carriage to hold said welding gun at a selected orientation relative to said flooring sheets as said carriage rolls across said flooring sheets.

10. A device according to claim 9 wherein said stabilizing carriage is comprised of an elongated carriage arm having front and rear ends, and said front end of said carriage arm is joined to said adapter means and said rear end of said carriage arm includes laterally projecting branches, and said carriage is further comprised of a carriage axle upon which said laterally separated rollers and said track follower are mounted.

11. A device according to claim 10 wherein said track follower is comprised of a ring projecting radially from said carriage axle so as to ride in said concave, upwardly facing channel where said flooring sheets meet.

12. A device according to claim 10 wherein said adapter means is comprised of an annular collar that fits about said body of said welding gun, and said adapter means includes a releasable and rotatably adjustable connecter that is attachable to said forward end of said carriage arm to releasably lock said carriage arm at a selected orientation relative to said annular collar.

13. A device according to claim 12 wherein said releasable and rotatably adjustable connector is comprised of a transversely oriented bolt.

14. A device according to claims 12 wherein said adapter means is further comprised of an angular orientation location mechanism for locating said collar on said welding gun body in an angular orientation relative thereto such that said releasable and adjustable connector resides directly beneath said welding gun body.

15. A device according to claim 14 wherein said collar and said welding gun body include mutually complementary locator means for consistently positioning said collar at a predetermined position of angular orientation relative to said welding gun body such that said releasable and rotatably adjustable connector and said seam follower consistently reside directly beneath said longitudinal axis of said welding gun body.

16. A device according to claim 14 wherein said adapter means is further comprised of a longitudinally split sleeve that fits snugly within the confines of said collar, and releasable anchoring means for securing said sleeve within said collar, whereby said sleeve is attachable to and detachable from said collar, thereby permitting optional use of said sleeve as an accessory to said collar.

17. A device according to claim 9 wherein said melting tip mounting post projects linearly from said nose cap at an angle of at least five degrees displaced from said longitudinal axis, and further comprising a hollow welding tip mounted on said tip mounting post and defining therewithin an elongated melting chamber, an upwardly directed welding rod receiving tube extending to said melting chamber, and said tip further defines on its underside an elongated dispensing mouth opening from said melting chamber and having front and rear extremities, an upturned toe located forward of said front extremity of said mouth, and a preheating duct leading from an orifice located behind said rear extremity of said mouth and communicating with said melting chamber.

18. Apparatus for sealing seams between adjacent sheets of flooring which define an upwardly facing, elongated groove where they meet comprising:

a portable, hand-held seam welding gun having a body defining a longitudinal axis and a heat conducting member projecting therefrom along said longitudinal axis, a heat concentration nose mounted on said heat conducting member and including a heating tip mounting post projecting at an angle of at least five degrees from said longitudinal axis, a hollow heating tip disposed on said heating tip mounting post and including a welding rod tube leading down into a melting chamber, wherein said melting chamber has an open, downwardly facing, elongated dispensing mouth with front and rear extremities and said tip also defines a forwardly directed, upturned toe forward of said front extremity of said mouth and a heating duct extending between said melting chamber and an orifice located behind said rear extremity of said mouth, a mobile, stabilizing guide formed with a pair of laterally spaced outboard rollers and a seam follower located midway between said outboard rollers for following said elongated groove where said sheets of flooring meet, and a collar disposed about said welding gun body and coupled to said stabilizing guide by a releasable joint, thereby allowing said welding gun to be supported above said stabilizing guide at a selected orientation relative to said sheets of flooring.

19. Apparatus according to claim 18 wherein said upturned toe has a raised forward extremity and is configured with a downwardly facing groove in its underside that extends from said forward extremity of said upturned toe to said front extremity of said dispensing mouth.

20. Apparatus according to claim 18 wherein said releasable joint is comprised of a bolt oriented transversely relative to said longitudinal axis that releasably clamps said stabilizing guide and said collar together.

* * * * *